(12) United States Patent
Seki et al.

(10) Patent No.: US 10,768,512 B2
(45) Date of Patent: Sep. 8, 2020

(54) PICTURE DISPLAY APPARATUS

(71) Applicant: IZUMI-COSMO COMPANY, LIMITED, Osaka (JP)

(72) Inventors: Kazuharu Seki, Tokyo (JP); Shuhei Kameda, Tokyo (JP); Teruyuki Abe, Tokyo (JP); Tomoya Morita, Tokyo (JP)

(73) Assignee: IZUMI-COSMO COMPANY, LIMITED, Osaka (JP)

( * ) Notice: Subject to any disclaimer, the term of this patent is extended or adjusted under 35 U.S.C. 154(b) by 0 days.

(21) Appl. No.: 16/449,218

(22) Filed: Jun. 21, 2019

(65) Prior Publication Data

US 2020/0064717 A1    Feb. 27, 2020

(30) Foreign Application Priority Data

Aug. 23, 2018  (JP) .................................. 2018-156358

(51) Int. Cl.
*G03B 21/10*    (2006.01)
(52) U.S. Cl.
CPC .................................... *G03B 21/10* (2013.01)
(58) Field of Classification Search
CPC ...... G03B 21/00; G03B 21/10; G03B 21/145; G06F 1/1616; G06F 1/1639; G06F 1/1641
See application file for complete search history.

(56) References Cited

U.S. PATENT DOCUMENTS

| | | | |
|---|---|---|---|
| 2012/0008104 A1* | 1/2012 | Goodall | F16M 11/10 353/79 |
| 2013/0134280 A1* | 5/2013 | Botting | G06F 3/0425 248/371 |
| 2014/0362117 A1* | 12/2014 | Paulson | G06F 1/1694 345/659 |
| 2016/0188123 A1* | 6/2016 | Fujiune | G03B 21/145 345/156 |

FOREIGN PATENT DOCUMENTS

JP          2018-36471 A       3/2018

* cited by examiner

*Primary Examiner* — Sultan Chowdhury
(74) *Attorney, Agent, or Firm* — Nakanishi IP Associates, LLC (57) ABSTRACT

A picture display apparatus avoids becoming less stable when a display body with a projection device is raised. A projector board stand includes a projector that projects a picture, a display body including a display surface to display the picture projected by the projector, and a body support supporting the display body. The projector is supported on the display body and protrudes in a front direction to project the picture on the display surface. The body support includes a lift unit that raises and lowers the display body. The lift unit moves the display body in a rear direction when the display body is raised.

10 Claims, 9 Drawing Sheets

PICTURE DISPLAY APPARATUS

BACKGROUND OF INVENTION

Field of the Invention

The present invention relates to a picture display apparatus that displays pictures projected by a projection device such as a projector or a movie projection machine.

Background Art

A known picture display apparatus may have a display body with an adjustable height, on which a projection device is mounted for displaying pictures on a display surface.

For example, Patent Literature 1 describes a picture display apparatus having a projection device (projector) located at an upward position and in substantially the middle of a display body in a facing direction of the display surface and fixed to the display body. The display body is vertically raised or lowered to adjust the height of the display surface.

In detail, the picture display apparatus described in Patent Literature 1 includes a frame holder (movable body support) that supports an outer frame (display body) on which the projection device is mounted to project pictures on the display surface. The frame holder is slidably fitted on a guide rail to vertically raise and lower the display body to adjust the height of the display surface.

However, the picture display apparatus described in Patent Literature 1 includes the projection device as a heavy object protruding in the facing direction of the display surface to project pictures on the display surface. In other words, the picture display apparatus includes the projection device located frontward from the middle in the front-rear direction, and thus the center of gravity of the entire apparatus is shifted frontward (or in the facing direction of the display surface) in the area of support (bottom area) of the picture display apparatus.

The projection device mounted on the display body protrudes in the facing direction of the display surface to project pictures on the display surface. When the display body is moved upward, the projection device as a heavy object protruding in the facing direction of the display surface is also moved upward along with the display body, causing the center of gravity of the entire apparatus to be elevated and shifted frontward (or in the facing direction of the display surface) in the area of support (bottom area) of the picture display apparatus. The elevated center of gravity forms a more acute angle of inclination with the support area as viewed from the side than before the display body is moved upward. Further, the picture display apparatus can have a more acute angle of inclination between the center of gravity and the support area in a front direction than in a rear direction, and can become less stable.

CITATION LIST

Patent Literature

Patent Literature 1: Japanese Unexamined Patent Application Publication No. 2018-36471

In response to this issue, one or more aspects of the present invention are directed to a picture display apparatus that avoids becoming less stable when a display body with a projection device is raised.

SUMMARY OF INVENTION

One aspect of the present invention provides a picture display apparatus including a projection device that projects a picture, a display body including a display surface to display the picture projected by the projection device, and a body support supporting the display body. The projection device is supported on the display body and protrudes in a facing direction of the display surface to project the picture on the display surface. The body support includes a lift unit that raises and lowers the display body. The lift unit moves the display body in an opposite direction from the display surface when the display body is raised.

The projection device includes a short focus projector, a projector, a movie projection machine, or another device that can project pictures such as videos or images. The picture includes a still image, a video, or text data.

The display surface may be a projector board, a screen, or another surface that can display a picture projected by the projection device. The projector board or the screen may have one surface or both surfaces serving as the display surface.

The projection device being supported on the display body and protruding in the facing direction of the display surface to project the picture on the display surface includes at least a part of the projection device being located frontward or in the facing direction of the display surface of the display body to project the picture on the display surface and being supported on an upper portion, a lower portion, or a side portion of the display body. The projection device may be supported on the display body either via another member or directly.

The lift unit may receive a driving force applied with a manual operation or a driving force applied in a manner other than the manual operation to raise and lower the display body. For example, the lift unit driven with a manual operation to raise and lower the display body may be further combined with a gas pneumatic, oil hydraulic, water hydraulic, or air pneumatic damping unit. The lift unit driven in a manner other than the manual operation to raise and lower the display body may be further combined with a driving cylinder for vertically raising and lowering the display body with a rod pushing the body, or a gear mechanism for vertically raising and lowering the display body using the rotation of gears. The drive source may be gas pneumatic or electrical.

The apparatus according to one or more aspects of the present invention avoids becoming less stable when the display body with the projection device is raised.

In detail, the body support supporting the display body on which the projection device as a heavy object is mounted to project pictures on the display surface supports the display body to move the display body rearward opposite to the facing direction of the display surface when the display body is raised by the lift unit.

The picture display apparatus including the projection device as a heavy object supported on the body support to protrude in the facing direction of the display surface to project the picture on the display surface has the projection device located frontward from the middle in the front-rear direction, and thus has the center of gravity of the entire apparatus shifted frontward (or in the facing direction of the display surface) in the area of support (bottom area) of the picture display apparatus. When the display body is moved upward and rearward by the lift unit, the center of gravity of the entire apparatus is also shifted upward and rearward (in the opposite direction from the display surface), thus shifting the center of gravity inward in the front-rear direction in the area of support (bottom area) of the apparatus. This structure avoids becoming less stable when the display body is raised.

The area of support (bottom area) described above is an area of contact of the body support with the floor surface on which the body support is installed, or an area defined by multiple points of contact of the body support with the floor surface.

In another aspect of the present invention, the body support may include a movable body support supporting the display body in a movable manner, and a direction limiting support that limits and supports the movable body support to be raised upward in the opposite direction from the display surface. The lift unit may include the movable body support and the direction limiting support.

The direction limiting support may limit and support the movable body support to be movable in a predetermined direction. The direction limiting support may include, for example, a box-shaped direction limiting support along which the movable body support is slidable, or a guide rail that limits the movable direction of the movable body support.

The body support may simply include the movable body support and the direction limiting support. For example, the body support may include separate installation members such as casters for moving the picture display apparatus or an elastic member for preventing slipping at the lower end of the body support.

The apparatus according to one or more aspects of the present invention includes the direction limiting support that limits the moving direction of the movable body support included in the lift unit, and thus limits the moving direction of the display body raised or lowered by the lift unit.

In another aspect of the present invention, the projection device may be located at an upward position and in substantially the middle of the display body in the facing direction of the display surface.

The apparatus according to one or more aspects of the present invention allows the projection device to be located at an upward position and in the horizontally middle of the display surface in the facing direction of the display surface. This structure achieves a well-balanced weight in the horizontal direction to raise and lower the display body in a stable manner.

For example, although a projection device located at a downward position of the display body can obstruct a person who may approach the device to, for example, write on the display surface, the projection device located at an upward position and in substantially the middle of the display body can avoid becoming an obstruction.

In another aspect of the present invention, the apparatus may further include a lift operation unit that raises and lowers the display body.

The apparatus according to one or more aspects of the present invention includes the lift operation unit that raises and lowers the display body, and improves user convenience.

In another aspect of the present invention, the lift operation unit may include a position retaining unit that retains the display body at an intended position within a raising and lowering range allowed by the lift unit.

The position retaining unit may retain the display body at an intended height position adjusted in a stepwise manner or in a non-stepwise manner within the raising and lowering range.

The apparatus according to one or more aspects of the present invention allows the display body moved by the lift operation unit to be retained at an intended height position. The apparatus can adjust the display surface to project the picture projected by the projection device to an intended height position as appropriate, and improves user convenience.

In another aspect of the present invention, the display body may include a pivot unit that pivots the display body between an upright posture in which the display body is located upright relative to a floor surface on which the display body is installed and a lying posture in which the display surface faces upward.

The apparatus according to one or more aspects of the present invention allows the display surface to display pictures projected by the projection device at a position pivoted by the pivot unit between the upright posture and the lying posture.

In detail, the display body displays the picture projected by the projection device on the display surface in the lying posture in which the display surface of the display body faces upward, in addition to the upright posture in which the display body is located upright relative to the floor surface on which the display body is installed.

This allows the display body in the lying posture to be used as, for example, a table with the display surface displaying pictures projected by the projection device. The picture display apparatus may be used in an appropriate state depending on the situation in which, for example, users may discuss across the projected pictures and thus improves user satisfaction.

In another aspect of the present invention, the lift operation unit may be located below the display body in the lying posture and around the pivot unit.

The apparatus according to one or more aspects of the present invention includes the lift operation unit that is less accessible for operation in the lying posture, preventing the display body in the lying posture from being raised and hitting the surrounding equipment.

In detail, for raising the display body, which is smaller (or thinner) in a direction intersecting with the raising and lowering direction in the upright posture, the user can check that the display body does not hit the surrounding equipment by simply checking the area above the display body in the upright posture, and thus can safely raise the display body.

For the display body in the lying posture extending in the direction intersecting with the raising and lowering direction, the user checks a wider area, thus with a higher likelihood that the display body being raised can hit the surrounding equipment. The lift operation unit is thus located below the display body in the lying posture and around the pivot unit to be more accessible for operation when the display body is in the upright posture and to be less accessible for operation when the display body is in the lying posture as obstructed by the display body. This prevents the display body in the lying posture from being raised and hitting the surrounding equipment.

In another aspect of the present invention, the apparatus may further include a pivot operation unit that operates the pivot unit to pivot the display body, and a state retaining unit that retains the display body at an intended angle between the upright posture and the lying posture.

The apparatus according to one or more aspects of the present invention can pivot the display body between the upright posture and the lying posture to retain the display body at an intended angle by simply operating the pivot operation unit.

The apparatus can adjust the display surface to display the picture projected by the projection device to an intended angle as appropriate, and improves user convenience.

In another aspect of the present invention, the pivot operation unit may be located at an upward position of the display body in the upright posture.

The apparatus according to one or more aspects of the present invention allows the pivot operation unit to be moved to a higher position when the display body is moved upward by the lift unit to a high position. The pivot operation unit located at the upward position has lower operability to pivot the display body from the upright posture to the lying posture.

In detail, when the display body is pivoted from the upright posture to the lying posture by the lift unit while retained after moved upward and rearward, the projection device as a heavy object moves upward more away from the floor surface than when the display body retained at a lower position is pivoted to change the posture, and can become less stable.

Further, when the display body is moved upward and rearward by the lift unit, the projection device as a heavy object is also moved upward and rearward. In this state, the display body is pivoted from the upright posture to the lying posture, together with the projection device as a heavy object fixed at an upward position of the display body.

The projection device as a heavy object that has been moved upward and rearward is further moved rearward and approaches the rear end of the support area, and can become less stable.

However, when the display body is located at a lower position, the pivot operation unit located at the upward position of the display body is easily accessible for operating the pivot operation unit to pivot the display body to the lying posture. In contrast, when the display body is moved upward, the pivot operation unit is also moved upward along with the display body to a higher position and has lower operability.

This structure allows the pivot operation unit to be more accessible for operation while the display body is located at a lower position and prevents the display body from being pivoted at an upward position. This structure avoids becoming less stable.

The picture display apparatus according to one or more aspects of the present invention avoids becoming less stable when the display body with the projection device is raised.

DETAILED DESCRIPTION

One embodiment of a projector board stand 1 will now be described with reference to the drawings.

Figure 1:
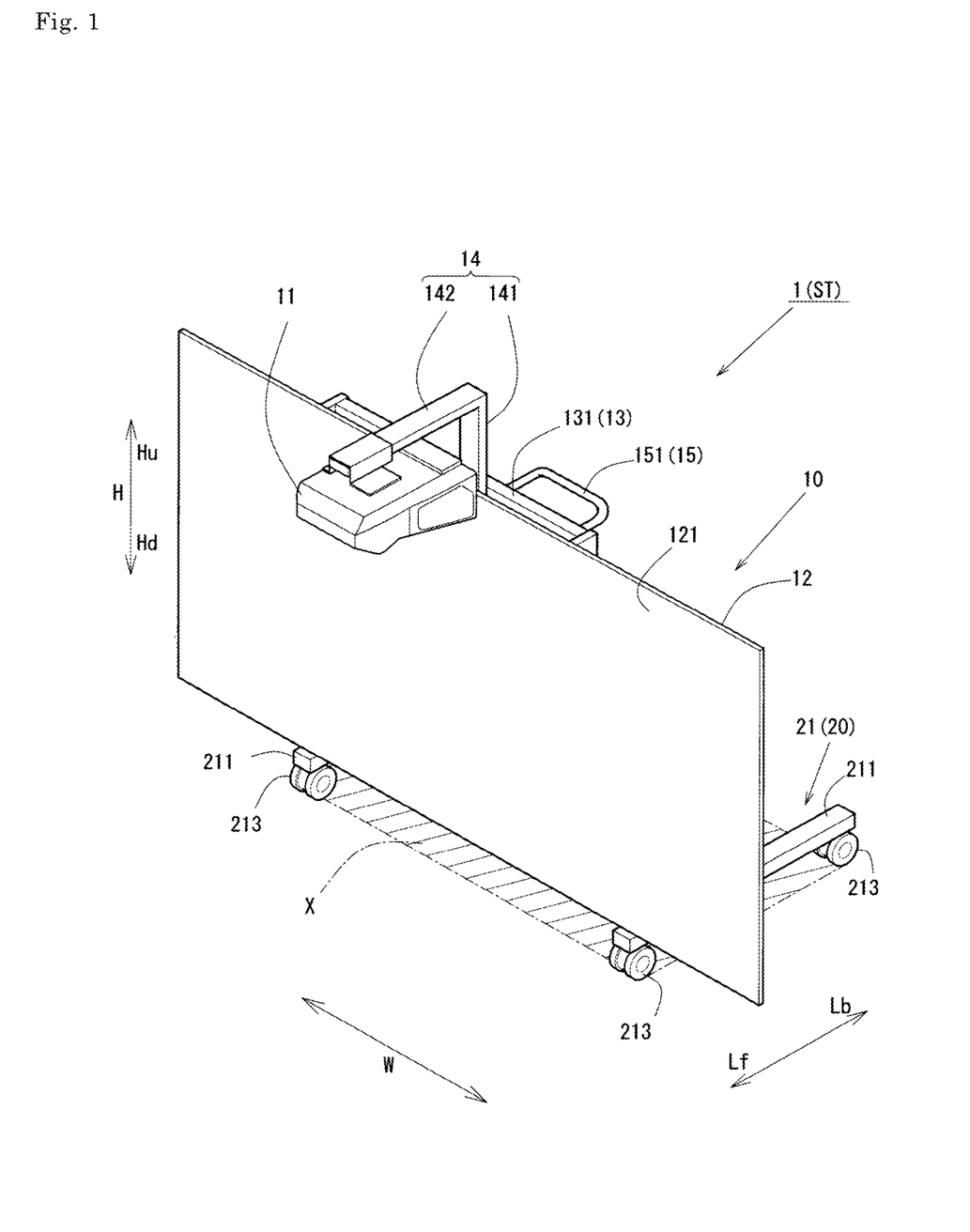
FIG. 1 is a perspective view of a projector board stand.
Figure 2:
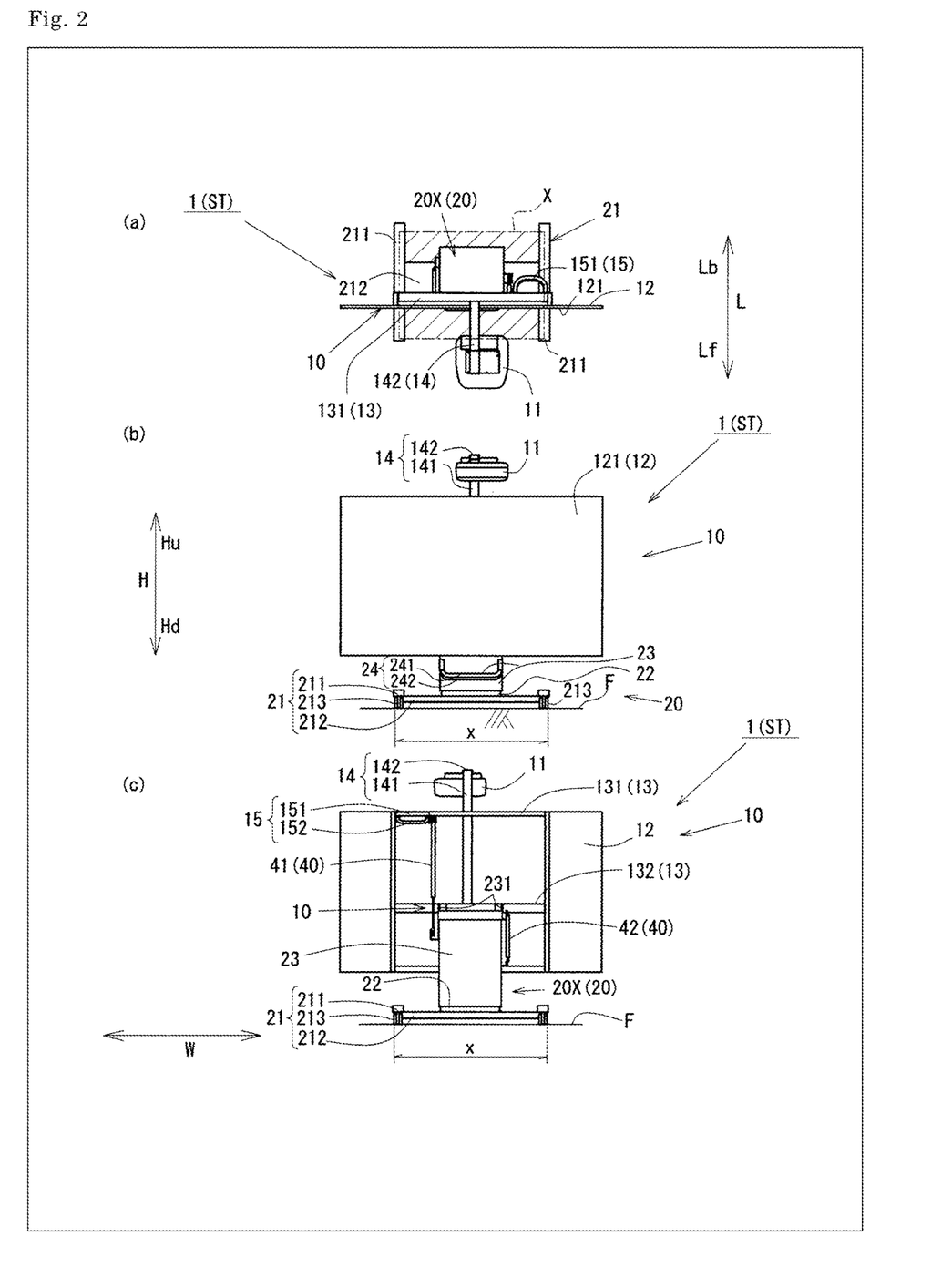
FIG. 2 is a diagram describing the projector board stand.
Figure 3:
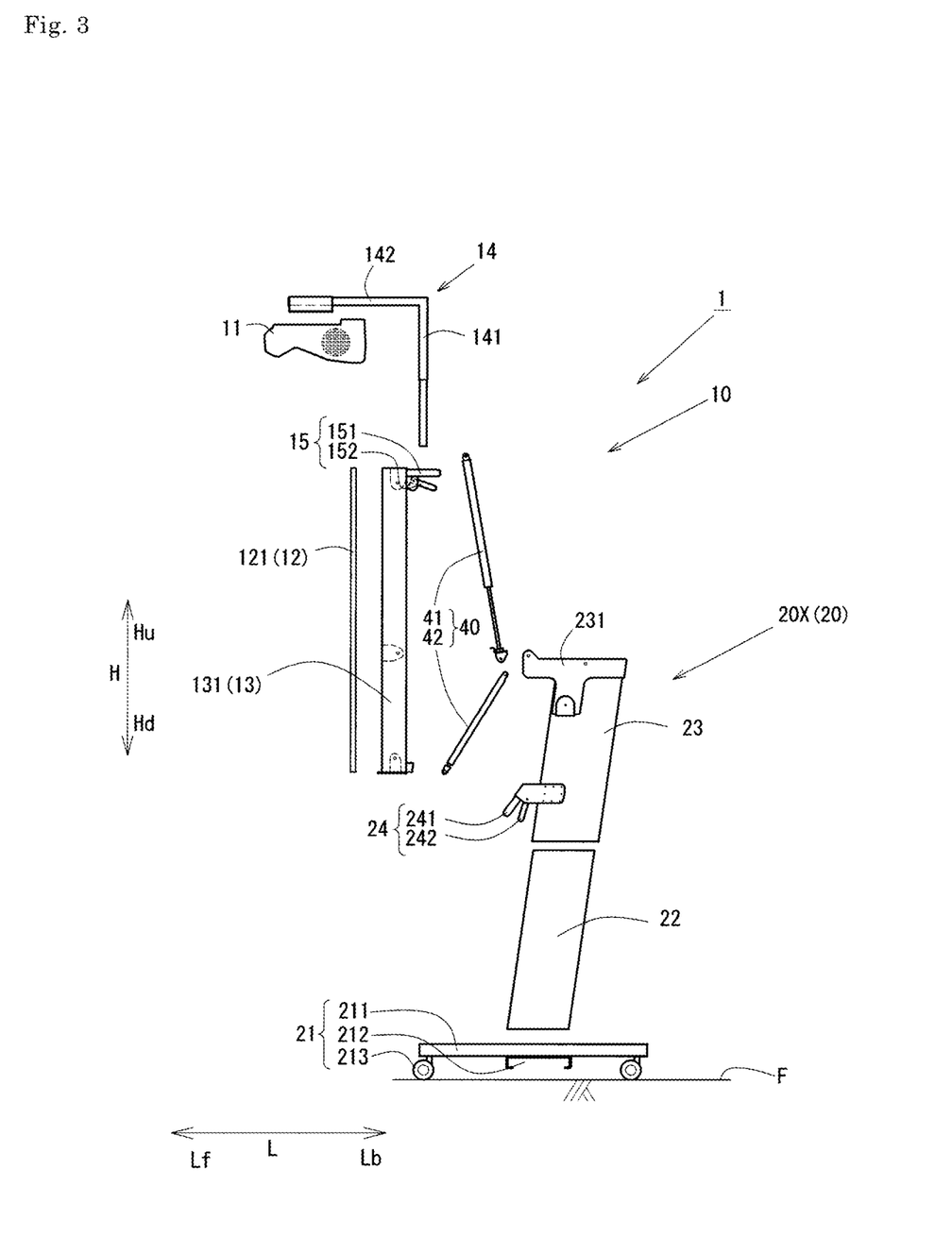
FIG. 3 is an exploded right side view of the projector board stand.
Figure 4:
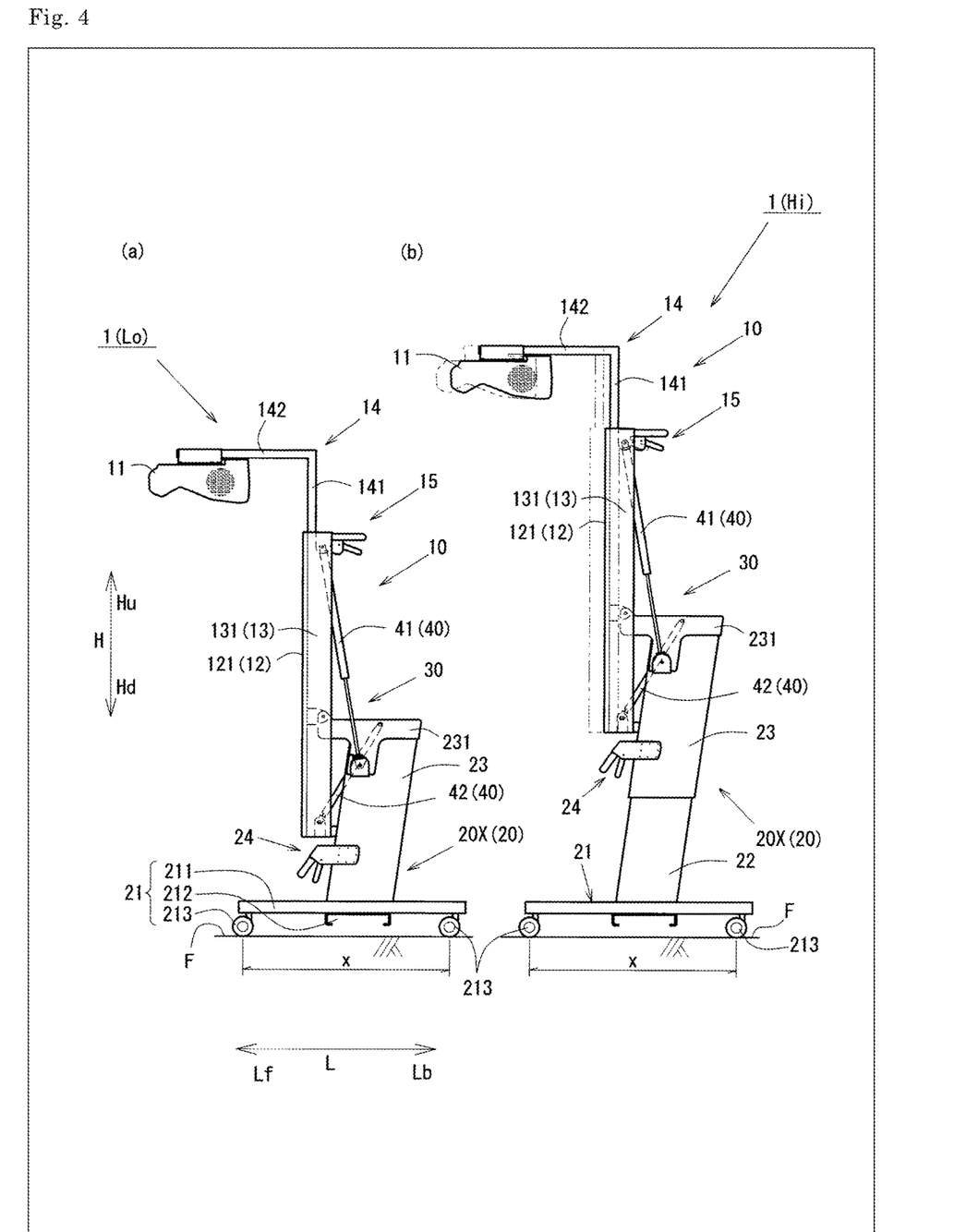
FIG. 4 is a right side view of the projector board stand describing raising and lowering of the stand.
Figure 5:
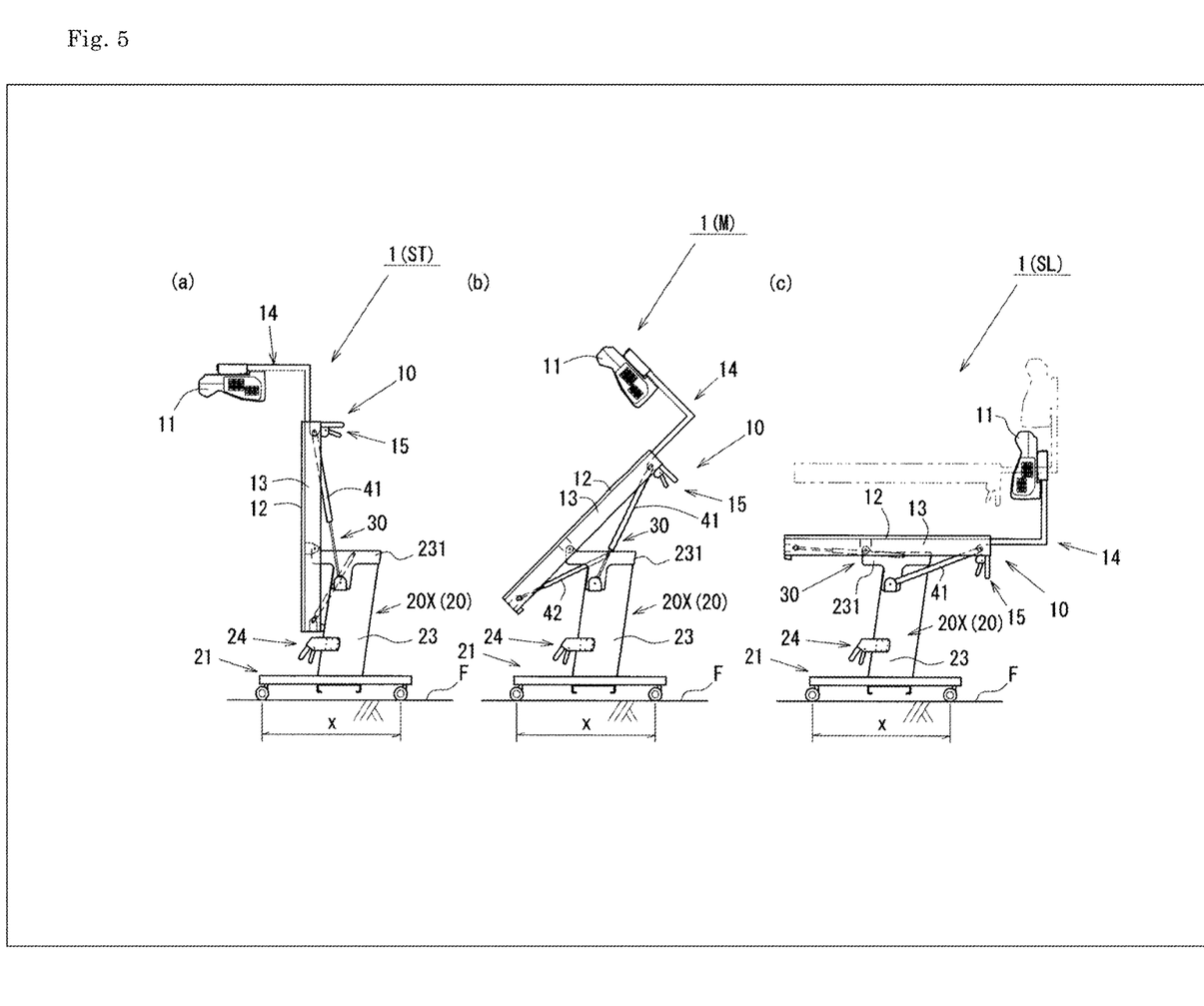
FIG. 5 is a right side view of the projector board stand describing pivoting of the stand.

FIG. 1 is a perspective view of the projector board stand 1. FIG. 2 is a diagram describing the projector board stand 1. FIG. 3 is an exploded right side view of the projector board stand 1. FIG. 4 is a right side view of the projector board stand 1 describing raising and lowering of the stand. FIG. 5 is a right side view of the projector board stand 1 describing pivoting of the stand.

In detail, FIG. 4(a) is a right side view of the projector board stand 1 with the display body 10 at a low position Lo, and FIG. 4(b) is a right side view of the projector board stand 1 with the display body 10 raised to a high position Hi. FIG. 5(a) is a right side view of the projector board stand 1 with the display body 10 in an upright posture ST, FIG. 5(b) is a right side view of the projector board stand 1 with the display body 10 in an intermediate posture M, and FIG. 5(c) is a right side view of the projector board stand 1 with the display body 10 in a lying posture SL.

In FIGS. 1 to 5, H indicates the vertical direction, W indicates the width direction, and L indicates the depth direction. Further, an upward direction Hu refers to being upward in the vertical direction H, a downward direction Hd refers to being downward in the vertical direction H, a front direction Lf refers to being frontward in the depth direction L, and a rear direction Lb refers to being rearward in the depth direction L.

As shown in FIGS. 1 to 3, the projector board stand 1 includes the display body 10 on which a projector 11 is mounted to project pictures, a body support 20 that supports the display body 10 on a floor surface F on which the projector board stand 1 is installed, and a pivot assist 40 that assists pivoting of the display body 10 relative to the body support 20.

The display body 10 includes the projector 11, a projector board 12 including a display surface 121 for displaying pictures projected by the projector 11, a frame 13 fixed to the rear surface of the projector board 12, a support arm 14 supporting the projector 11, and a pivot operation unit 15 for pivoting the display body 10.

The projector 11 is a short focus projector mounted on the projector board 12 in the upward direction Hu and in substantially the middle in the width direction W. The projector 11 is connected to, for example, a personal computer (not shown) to project an intended picture on the display surface 121 in the projector board 12.

The projector board 12 is a horizontal rectangular plate having the sides larger in the width direction W than in the vertical direction H as viewed from the front, and having an appropriate thickness. The projector board 12 has a surface in the front direction Lf serving as the display surface 121 for displaying pictures projected by the projector 11.

The frame 13 is a metal frame including an outer frame 131 substantially square as viewed from the rear and a lateral frame 132 extending in the width direction W in substantially the middle of the outer frame 131 in the vertical direction H. The frame 13 is substantially square with a middle lateral bar as viewed from the rear and fixed to the rear surface of the projector board 12.

The support arm 14 extends from the projector board 12 and supports the projector 11 as a heavy object. The support arm 14 includes a vertical portion 141 fixed to the rear surface of the projector board 12 and a horizontal portion 142 extending in the front direction Lf from the upper end of the vertical portion 141, thus forming an inverted-L-shape as viewed from the side. The support arm 14 receives the projector 11 at the distal end of the horizontal portion 142.

As shown in FIG. 2(c), the pivot operation unit 15 is located, as viewed from the front, in the upward direction Hu and rightward from the middle in the width direction W of the outer frame 131 in the frame 13 fixed to the rear surface of the projector board 12. The pivot operation unit 15 includes a fixed handle 151 having a recessed profile as viewed from above and a movable handle 152 having an end pivotably attached to the fixed handle 151 in the front direction Lf. The fixed handle 151 and the movable handle 152 together form a lateral V-shape as viewed from the side.

The pivot operation unit 15 is connected to a pivot retaining mechanism (not shown) in the pivot unit 30 (described later) with an operation cable (not shown). Pivotably operating the movable handle 152 in the upward direction Hu relative to the fixed handle 151 acting as a reaction force thus releases the pivot retaining mechanism (not shown) in the pivot unit 30. The display body 10 is thus pivoted by the pivot unit 30 relative to the body support 20. In contrast, releasing the pivot operation performed by the movable handle 152 allows the pivot retaining mechanism to retain the display body 10 at a pivoted position relative to the body support 20.

The display body 10 with the above structure receives the frame 13 fixed to the rear surface of the projector board 12 and the vertical portion 141 in the support arm 14 fixed to the rear surface of the projector board 12 in substantially the middle in the width direction W. The support arm 14 is attached to the projector board 12 to have the horizontal portion 142 in the support arm 14 protruding at the display surface 121 in the projector board 12, or protruding in the front direction Lf.

The projector 11 attached to the horizontal portion 142 in the support arm 14 thus protrudes in the front direction Lf at the display surface 121 in the projector board 12 in the upward direction Hu and in substantially the middle in the width direction W of the projector board 12.

The pivot operation unit 15 is attached to an upper portion of the frame 13, and an operation cable (not shown) connected to the pivot retaining mechanism (not shown) in the pivot unit 30 (described later) or to be connected to the pivot unit 30 is installed to complete the assembly of the display body 10.

The body support 20, which forms the projector board stand 1 together with the display body 10, includes, in order from the bottom component in the downward direction Hd, a bottom support base 21, a direction limiting support 22 receiving the bottom support base 21 fixed in the downward direction Hd, a movable body support 23 joined to the direction limiting support 22 in a manner slidable in the vertical direction H, and a lift operation unit 24 for raising and lowering the movable body support 23 relative to the direction limiting support 22.

The bottom support base 21 includes two bases 211 spaced at a predetermined interval in the width direction W and extending in the depth direction L, and a base connection 212 coupling the two bases 211 spaced at the predetermined interval in the width direction W, thus forming an H-shape that is elongated in the width direction W and is shortened in the depth direction L as viewed from above. The bottom support base 21 includes, at its contact points with the floor surface F, casters 213 attached around both ends in the depth direction L of each base 211.

As shown in FIG. 3, the direction limiting support 22 is a rectangular hollow column with a substantially rectangular cross section that is elongated in the width direction W as viewed from above and is parallelogrammatic as viewed from the side. The direction limiting support 22 is fixed to the base connection 212 in the bottom support base 21 in the middle in the width direction W. The direction limiting support 22 is extended in the upward direction Hu and inclined in the rear direction Lb.

As shown FIG. 3, the movable body support 23 is a rectangular hollow column having a cross section that is slightly larger than the direction limiting support 22 with the above structure as viewed from above and is parallelogrammatic as viewed from the side. The movable body support 23 is extended in the upward direction Hu and inclined in the rear direction Lb. The direction limiting support 22 is joined to the movable body support 23 with the above structure and is accommodated in a slidable manner. The movable body support 23 is slidable in the upward direction Hu and the rear direction Lb relative to the direction limiting support 22.

The direction limiting support 22 and the movable body support 23 joined together in the manner described above contain a lift mechanism and a lift retaining mechanism (both not shown). The lift mechanism is, for example, an extendable jack that applies a predetermined urging force or damping force to smoothly raise and lower the display body 10 in the vertical direction H against the gravity of the display body 10 acting in the downward direction Hd. The lift retaining mechanism retains the movable body support 23 relative to the direction limiting support 22.

The direction limiting support 22 and the movable body support 23 joined together in a slidable manner as described above, and the lift mechanism and the lift retaining mechanism contained in the direction limiting support 22 and the movable body support 23 form a lift unit 20X.

The movable body support 23 includes, on both side surfaces in the upward direction Hu, pivot supports 231 that are pivotably coupled to the lateral frame 132 in the frame 13 of the display body 10. The pivot support 231 is a substantially T-shaped plate as viewed from the side. The T-shaped plate has a distal end in the front direction Lf pivotably coupled to the lateral frame 132 in the frame 13 and has a rear portion in the rear direction Lb pivotably coupled to one end of an assisting jack 41 and one end of an assisting jack 42 in the pivot assist 40 (described later).

The lift operation unit 24 for raising and lowering the movable body support 23, which is to be coupled to the display body 10, relative to the direction limiting support 22 is located downward from the middle in the vertical direction H at a front surface of the movable body support 23.

The lift operation unit 24 includes a fixed handle 241 having a recessed profile as viewed from above and a movable handle 242 having an end in the rear direction Lb pivotably attached to the fixed handle 241, thus together forming a V-shape that opens downward as viewed from the side.

The lift operation unit 24 is connected to the lift retaining mechanism (not shown) described above. Pivotably operating the movable handle 242 in the upward direction Hu relative to the fixed handle 241, which acts as a reaction force, thus releases the lift retaining mechanism (not shown) to allow the lift mechanism to raise and lower the movable body support 23 relative to the direction limiting support 22. In contrast, releasing the pivot operation performed by the movable handle 242 allows the movable body support 23 to be retained at a position where raising and lowering of the movable body support 23 is limited relative to the direction limiting support 22.

The pivot assist 40 that assists pivotable movement of the display body 10 relative to the body support 20 includes the upper assisting jack 41 and the lower assisting jack 42. The upper assisting jack 41 couples, in an extendable manner, the pivot support 231 to an upper portion of the display body 10, which is pivotably connected to the movable body support 23 with the pivot support 231 described above. The lower assisting jack 42 couples, in an extendable manner, the pivot support 231 to a lower portion of the display body 10.

The assisting jacks 41 and 42 are extendable jacks to apply a predetermined urging force or damping force.

In the projector board stand 1 including the components described above, the direction limiting support 22 is fixed to a middle portion of the base connection 212 in the width direction W included in the bottom support base 21 to be extended in the upward direction Hu. The movable body support 23 is fitted on the direction limiting support 22. The lift mechanism and the lift retaining mechanism described above are then placed inside the direction limiting support 22 and the movable body support 23, and are joined to the movable body support 23 to connect the lift retaining mechanism to the lift operation unit 24. This completes the assembly of the body support 20.

The pivot support 231 in the movable body support 23 has a front end in the front direction Lf pivotally coupled to the lateral frame 132 in the frame 13 on the rear surface of the display body 10 assembled as described above. The pivot assist 40 is then joined to this structure to complete the assembly of the projector board stand 1.

In the projector board stand 1 including the display body 10 pivotably coupled to the body support 20 and the pivot assist 40 joined as described above, the lateral frame 132 on the display body 10 and the pivot support 231 in the movable body support 23 form the pivot unit 30 that pivots the display body 10 relative to the body support 20 in the projector board stand 1.

The casters 213 at both ends in the depth direction L of the bases 211 in the bottom support base 21 of the body support 20 are in contact with the floor surface F. The support area X of the projector board stand 1 is thus defined by the four casters 213 as viewed from above.

The projector board stand 1 assembled as described above is shown in FIG. 4(a) with the display body 10 in the upright posture ST at the low position Lo. In this state, the lift operation unit 24 is operated to apply a force to move the display body 10 in the upward direction Hu, causing the movable body support 23 coupled with the display body 10 to move in the upward direction Hu relative to the direction limiting support 22 in the body support 20. The movable body support 23 moves along the direction limiting support 22, which is parallelogrammatic as viewed from the side and is extended in the upward direction Hu and inclined in the rear direction Lb. As shown in FIG. 4(b), the display body 10 coupled with the movable body support 23 then gradually moves in the rear direction Lb when the display body 10 is raised.

In contrast, when the display body 10 is at the high position Hi as shown in FIG. 4(b), the lift operation unit 24 is operated to apply a force to move the display body 10 in the downward direction Hd, causing the movable body support 23 coupled with the display body 10 to move in the downward direction Hd relative to the direction limiting support 22 in the body support 20. The movable body support 23 moves along the direction limiting support 22, which is parallelogrammatic as viewed from the side and is extended in the downward direction Hd and inclined in the front direction Lf. As shown in FIG. 4(a), the display body 10 coupled with the movable body support 23 then gradually moves in the front direction Lf when the display body 10 is lowered.

In the projector board stand 1 shown in FIG. 5(a) with the display body 10 in the upright posture ST at the low position Lo, the pivot operation unit 15 is operated to apply a force to pull the display body 10 in the rear direction Lb. The upper portion of the display body 10 pivotably coupled to the movable body support 23 (body support 20) with the pivot unit 30 then moves in the rear direction Lb as shown in FIG. 5(b). The display body 10 may be pivoted to have the lying posture SL in which the display body 10 is substantially parallel to the contacting floor surface F as shown in FIG. 5(c), or may be pivoted to have the intermediate posture M in which the display body 10 is pivoted to have an intended pivot angle as shown in FIG. 5(b). At an intended pivoted position, releasing the pivot operation performed by the pivot operation unit 15 allows the pivot retaining mechanism to retain the display body 10 at the pivoted position relative to the body support 20.

As described above, the projector board stand 1 includes the projector 11 that projects pictures, the display body 10 including the display surface 121 for displaying the pictures projected by the projector 11, and the body support 20 supporting the display body 10. The projector 11 is supported on the display body 10 and protrudes in the front direction Lf to project the pictures on the display surface 121. The body support 20 includes the lift unit 20X that raises and lowers the display body 10. The lift unit 20X moves the display body 10 in the rear direction Lb when the display body 10 is raised. The projector board stand 1 avoids becoming less stable when the display body 10 with the projector 11 is raised.

In detail, the body support 20 supporting the display body 10 on which the projector 11 as a heavy object is mounted to project pictures on the display surface 121 supports the display body 10 to move the display body 10 in the rear direction Lb opposite to the front direction Lf when the display body 10 is raised by the lift unit 20X.

The projector board stand 1 including the projector 11 as a heavy object supported on the body support 20 to protrude in the front direction Lf to project pictures on the display surface 121 has the center of gravity of the entire projector board stand 1 shifted in the front direction Lf in the support area X (bottom area) of the projector board stand 1. When the display body 10 is moved in the upward direction Hu and in the rear direction Lb by the lift unit 20X, the center of gravity of the entire projector board stand 1 is also shifted in the upward direction Hu and in the rear direction Lb, thus shifting the center of gravity inward in the depth direction L in the support area X (bottom area). This structure avoids becoming less stable when the display body 10 is raised.

The body support 20 includes the movable body support 23 supporting the display body 10 in a movable manner, and the direction limiting support 22 that limits and supports the movable body support 23 to be raised in the upward direction Hu and in the rear direction Lb. The lift unit 20X includes the movable body support 23 and the direction limiting support 22. The direction limiting support 22 limits the moving direction of the movable body support 23 included in the lift unit 20X, and thus limits the moving direction of the display body 10 raised or lowered by the lift unit 20X.

The projector 11 is located in the upward direction Hu and in substantially the middle in the width direction W of the display body 10 in the front direction Lf. For example, the projector 11 as a heavy object is thus located in the upward direction Hu and in substantially the middle in the width direction W of the projector board stand 1. This structure achieves a well-balanced weight in the width direction W to raise and lower the display body 10 in a stable manner.

For example, although the projector 11 located at a downward position of the display body 10 can obstruct a person who may approach the device to, for example, write on the display surface 121, the projector 11 located at an upward position and in substantially the middle of the display body 10 can avoid becoming an obstruction.

The apparatus includes the lift operation unit 24 that raises and lowers the display body 10, and improves user convenience.

The lift operation unit 24 is connected to the lift retaining mechanism that retains the display body 10 at an intended position within the raising and lowering range allowed by the lift unit 20X. This allows the display body 10 moved by the lift operation unit 24 to be retained at the intended height position. The apparatus can adjust the display surface 121 for displaying the pictures projected by the projector 11 to an intended height position as appropriate, and improves user convenience.

The apparatus includes the pivot unit 30 that pivots the display body 10 between the upright posture ST in which the display body 10 is located upright relative to the floor surface F on which the display body 10 is installed and the lying posture SL in which the display surface 121 faces in the upward direction Hu. The display surface 121 thus displays pictures projected by the projector 11 at a position pivoted by the pivot unit 30 between the upright posture ST and the lying posture SL.

In detail, the display body 10 displays pictures projected by the projector 11 on the display surface 121 in the lying posture SL in which the display surface 121 of the display body 10 faces in the upward direction Hu, in addition to the upright posture ST in which the display body 10 is located upright relative to the floor surface F on which the display body 10 is installed.

This allows the display body 10 in the lying posture SL to be used as, for example, a table with the display surface 121 displaying pictures projected by the projector 11. The projector board stand 1 may be used in an appropriate state depending on the situation in which, for example, users may discuss across the projected pictures and thus improves user satisfaction.

The lift operation unit 24 is located below the display body 10 in the lying posture SL and around the pivot unit 30. The lift operation unit 24 is thus less accessible for operation in the lying posture SL, preventing the display body 10 in the lying posture SL from being raised and hitting the surrounding equipment.

In detail, for raising the display body 10, which is smaller (or thinner) in a direction intersecting with the raising and lowering direction in the upright posture ST, the user can check that the display body 10 does not hit the surrounding equipment by simply checking the area above the display body 10 in the upright posture ST, and thus can safely raise the display body 10.

For the display body 10 in the lying posture SL extending in the direction intersecting with the raising and lowering direction as shown in FIG. 5(c), the user checks a wider area, thus with a higher likelihood that the display body 10 being raised can hit the surrounding equipment. The lift operation unit 24 is thus located below the display body 10 in the lying posture SL and around the pivot unit 30 to be more accessible for operation when the display body 10 is in the upright posture ST and to be less accessible for operation when the display body 10 is in the lying posture SL as obstructed by the display body 10. This prevents the display body 10 in the lying posture SL from being raised and hitting the surrounding equipment.

The apparatus includes the pivot operation unit 15 that operates the pivot unit 30 to pivot the display body 10 and the pivot retaining mechanism that retains the display body 10 at an intended angle between the upright posture ST and the lying posture SL. The apparatus can pivot the display body 10 between the upright posture ST and the lying posture SL to retain the display body 10 at an intended angle by simply operating the pivot operation unit 15.

The apparatus can adjust the display surface 121 for displaying the pictures projected by the projector 11 to an intended angle as appropriate, and improves user convenience.

The pivot operation unit 15 is located in the upward direction Hu on the display body 10 in the upright posture ST. The pivot operation unit 15 is moved to a higher position when the display body 10 is moved in the upward direction Hu by the lift unit 20X to a high position Hi. The pivot operation unit 15 has lower operability to pivot the display body 10 from the upright posture ST to the lying posture SL.

In detail, when the display body 10 is pivoted from the upright posture ST to the lying posture SL by the lift unit 20X while retained after moved in the upward direction Hu and in the rear direction Lb to a high position Hi, the projector 11 as a heavy object moves in the upward direction Hu more away from the floor surface F than when the display body 10 retained at a lower position is pivoted to change the posture, and can become less stable.

Further, when the display body 10 is moved in the upward direction Hu and in the rear direction Lb by the lift unit 20X, the projector 11 as a heavy object is also moved in the upward direction Hu and in the rear direction Lb. In this state, the display body 10 is pivoted from the upright posture ST to the lying posture SL, together with the projector 11 as a heavy object fixed in the upward direction Hu to the display body 10.

The projector 11 as a heavy object that has been moved in the upward direction Hu and in the rear direction Lb is further moved in the rear direction Lb and approaches the rear end of the support area X, and can become less stable.

However, when the display body 10 is located at a lower position, the pivot operation unit 15 located in the upward direction Hu on the display body 10 is easily accessible for operating the pivot operation unit 15 to pivot the display body 10 to the lying posture SL. In contrast, when the display body 10 is moved in the upward direction Hu, the pivot operation unit 15 is also moved along with the display body 10 in the upward direction Hu to a higher position and has lower operability.

This structure allows the pivot operation unit 15 to be more accessible for operation while the display body 10 is located at a lower position and prevents the display body 10 from being pivoted at a position in the upward direction Hu. This structure avoids becoming less stable.

The components described in the above embodiments correspond to the components in the claimed invention in the manner described below: the projection device in the claimed invention corresponds to the projector 11, and similarly, the display surface to the display surface 121, the display body to the display body 10, the body support to the body support 20, the facing direction of the display surface to the front direction Lf, the lift unit to the lift unit 20X, the opposite direction to the rear direction Lb, the floor surface to the floor surface F, the picture display apparatus to the projector board stand 1, the movable body support to the movable body support 23, the direction limiting support to the direction limiting support 22, upward to the upward direction Hu, the lift operation unit to the lift operation unit 24, the position retaining unit to the lift retaining mechanism, the upright posture to the upright posture ST, the lying posture to the lying posture SL, the pivot unit to the pivot unit 30, the pivot operation unit to the pivot operation unit 15, and the state retaining unit to the pivot retaining mechanism.

However, the invention may be implemented in many embodiments other than the embodiment described above.

The projector 11 may be a common projector or a movie projection machine, in addition to the short focus projector, or may be another device that can project pictures such as videos or images.

The projector board 12 may have both sides serving as the display surfaces 121. The projector 11 may be mounted on a lower portion or a side portion of the projector board 12, instead of being mounted on the upper portion of the projector board 12.

The projector 11 is fixed to the projector board 12 with the support arm 14 in the above embodiment. However, the projector 11 may be fixed to the projector board 12 directly without the support arm 14.

The display body 10 is manually raised and lowered by operating the lift unit 20X in the above embodiment. However, the display body 10 may be raised and lowered by using, for example, a gas pneumatic or electrical drive source.

The pivot retaining mechanism operated by the pivot operation unit 15 or the lift retaining mechanism operated by the lift operation unit 24 described above retains the display body at an intended position in a non-stepwise manner. However, these mechanisms may retain the display body at an intended position in a stepwise manner.

The direction limiting support 22 and the movable body support 23 may have an inclination angle in the rear direction Lb other than the angle shown in the figures. The direction limiting support 22 and the movable body support 23 may be inclined more in the rear direction Lb or may be inclined not only in the rear direction Lb but also in the width direction W.

For example, as shown in FIGS. 6 to 9, the direction limiting support 22a and the movable body support 23a in the body support 20a may be inclined more in the rear direction Lb.

Figure 6:
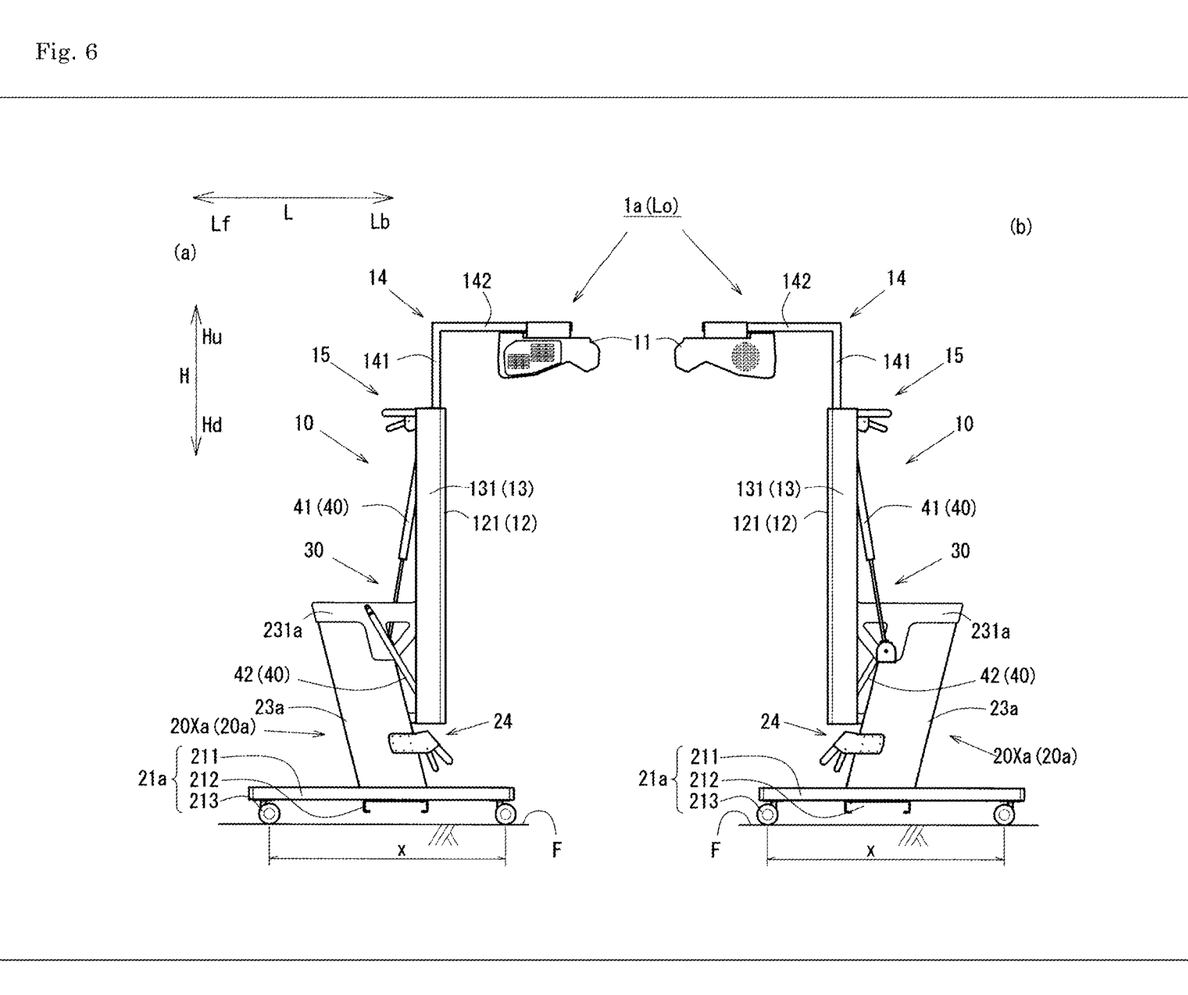
FIG. 6 is a diagram describing a projector board stand according to another embodiment.
Figure 7:
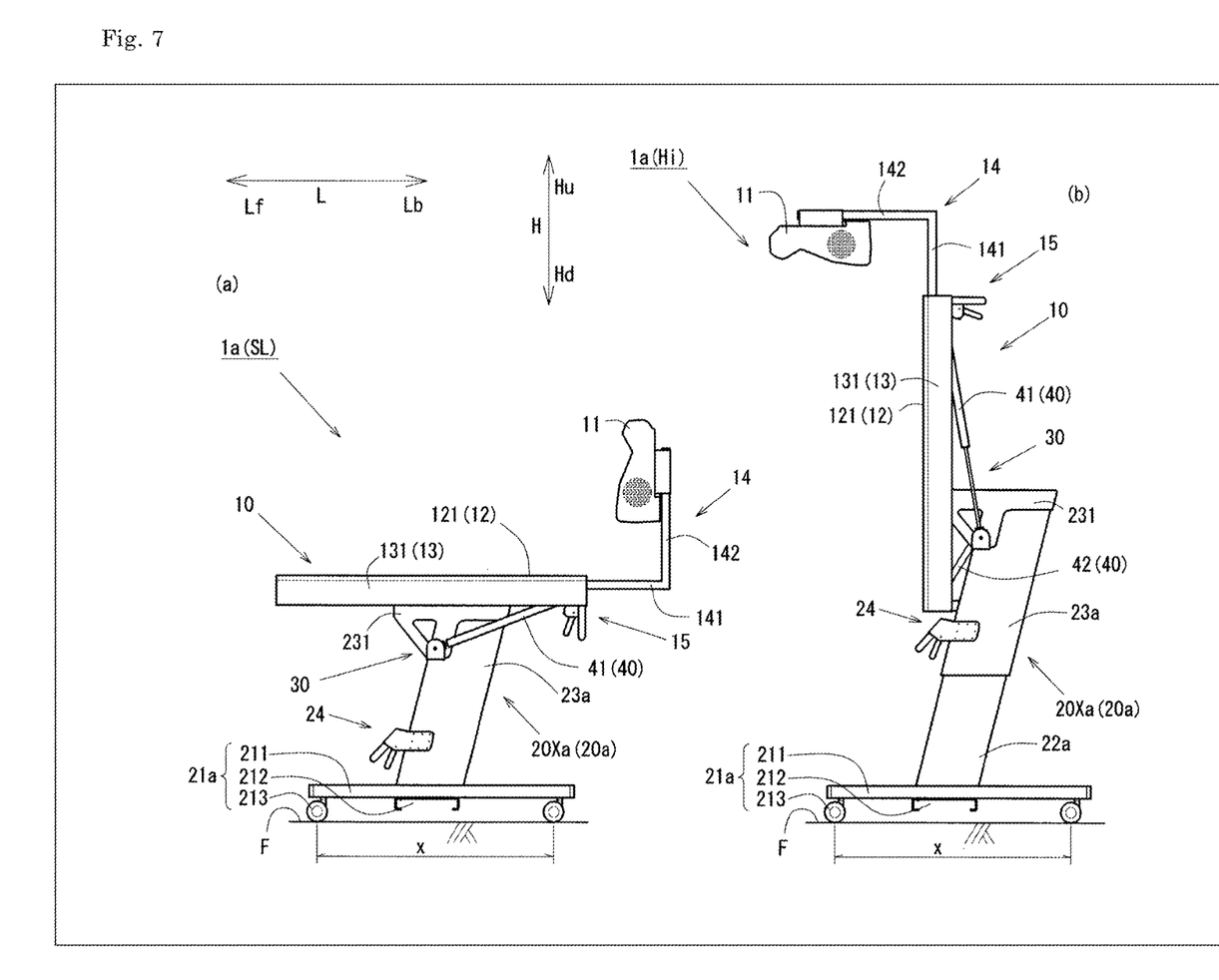
FIG. 7 is a right side view of the projector board stand according to the other embodiment describing raising, lowering, and pivoting of the stand.
Figure 8:
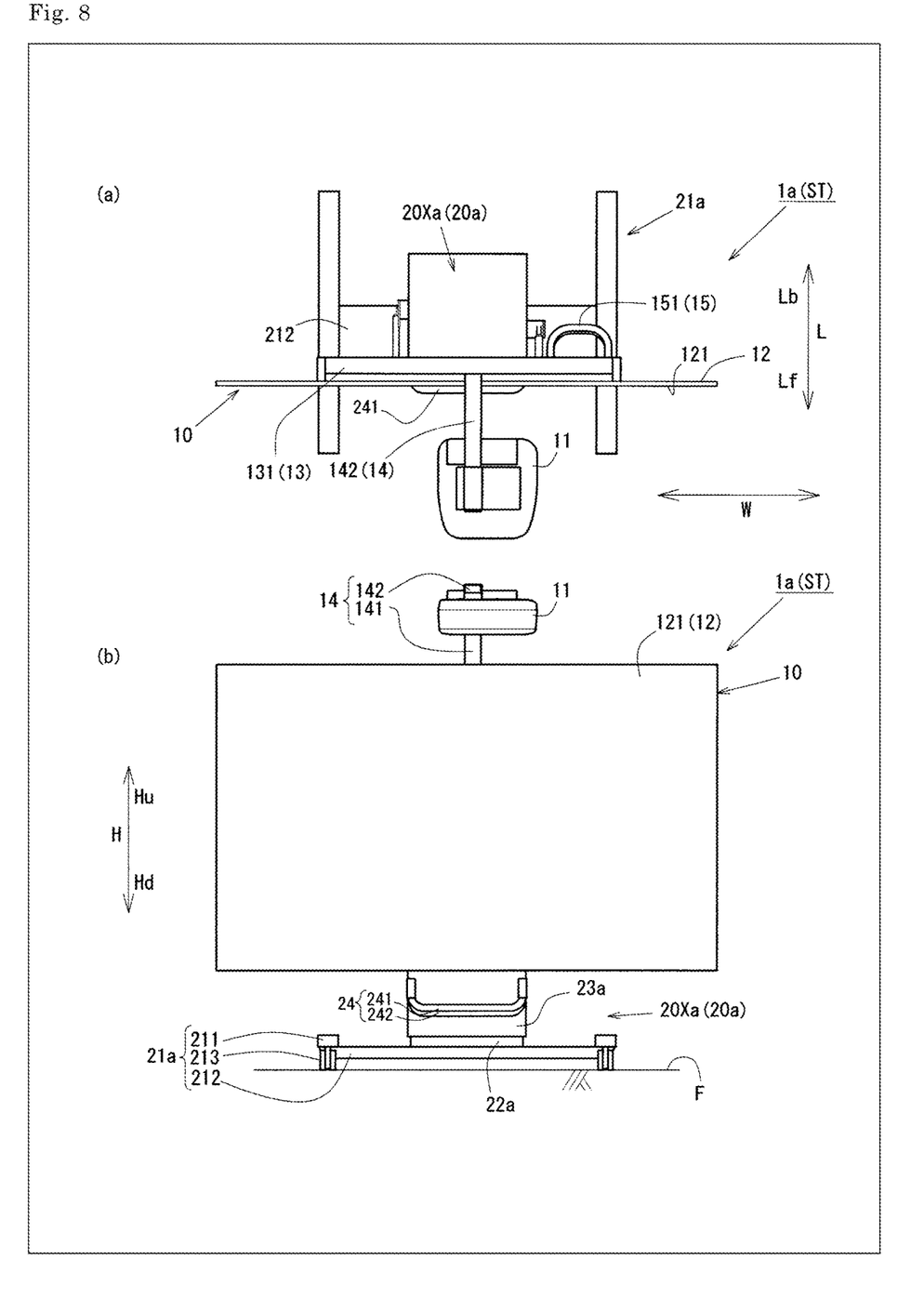
FIG. 8 is a diagram describing the projector board stand according to the other embodiment.
Figure 9:
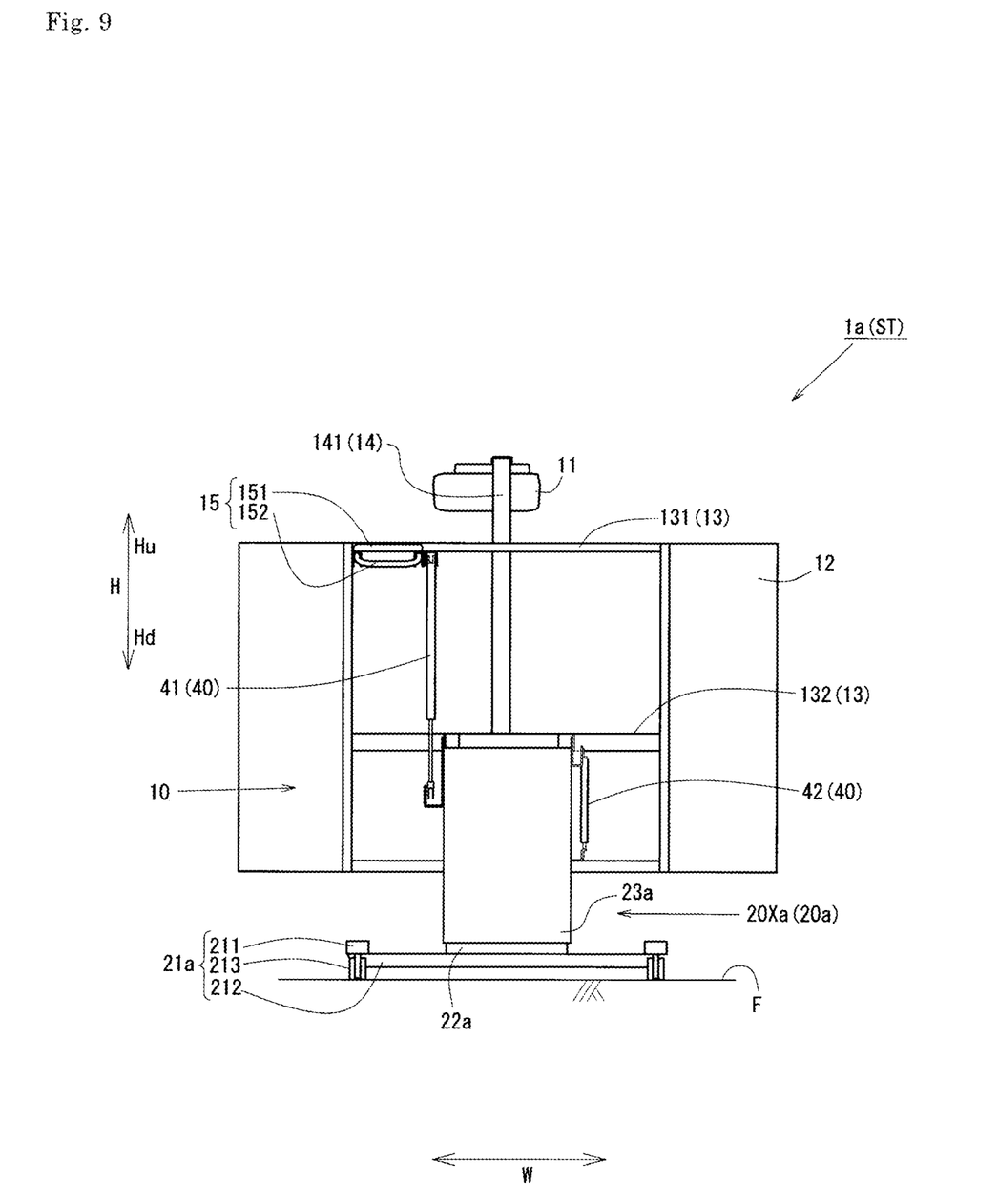
FIG. 9 is a rear view of the projector board stand according to the other embodiment.

FIG. 6 is a diagram describing a projector board stand 1a according to another embodiment. FIG. 7 is a right side view of the projector board stand 1a describing raising, lowering, and pivoting of the stand. FIG. 8 is a diagram describing the projector board stand 1a according to the other embodiment. FIG. 9 is a rear view of the projector board stand 1a according to the other embodiment.

In detail, FIG. 6(a) is a left side view of the projector board stand 1a, FIG. 6(b) is a right side view of the projector board stand 1a, FIG. 7(a) is a right side view of the projector board stand 1a with the display body 10a in a lying posture SL, and FIG. 7(b) is a right side view of the projector board stand 1a with the display body 10a raised to a high position Hi.

The projector board stand 1a shown in FIGS. 6 to 9 has the same structure as the projector board stand 1 described above. The same components are given the same reference numerals and will not be described.

The projector board stand 1a shown in FIGS. 6 to 9 includes a lift unit 20Xa including the direction limiting support 22a and the movable body support 23a inclined more in the rear direction Lb than the direction limiting support 22 and the movable body support 23 in the projector board stand 1 described above by about six degrees.

A body support 20a including the direction limiting support 22a and the movable body support 23a inclined more in the rear direction Lb as described above includes a bottom support base 21a, which is greater in the depth direction L than the bottom support base 21 in the body support 20 in the projector board stand 1 described above.

The projector board stand 1a including the body support 20a including the lift unit 20Xa having the direction limiting support 22a and the movable body support 23a inclined more in the rear direction Lb than the direction limiting support 22 and the movable body support 23 in the projector board stand 1 moves the display body 10 more in the rear direction Lb when the display body 10 is raised by the lift unit 20Xa. This structure further avoids becoming less stable when the display body 10 is raised than the projector board stand 1 described above.

The projector board stand 1a including the lift unit 20Xa having the direction limiting support 22a and the movable body support 23a inclined more in the rear direction Lb than the direction limiting support 22 and the movable body support 23 in the projector board stand 1 as described above produces the same advantageous effects as the projector board stand 1. Further, the direction limiting support 22a and the movable body support 23a inclined more in the rear direction Lb can improve the advantageous effects.

To produce the above advantageous effects, the body support is to be inclined in the rear direction Lb at about five to twenty degrees, rather than being inclined at any angle. For example, when the body support is inclined in the rear direction Lb at less than five degrees, the stability of the display body 10 being raised remains similar to when raised or lowered in the vertical direction. When the body support is inclined in the rear direction Lb at more than 20 degrees, the projector board stand uses a larger support area X (bottom area) of the stand, and thus is upsized, failing to achieve user satisfaction.

In contrast, the body support inclined in the rear direction Lb at about five to twenty degrees prevents the support area X (bottom area) from increasing inadequately and avoids becoming less stable when the display body 10 is raised.

In the projector board stand 1 or 1a described above, the projector 11 is supported on the display body 10 and protrudes in the front direction Lf to project pictures on the display surface 121, and the lift unit 20X or 20Xa included in the body support 20 or 20a moves the display body 10 in the rear direction Lb when the display body 10 is raised. However, when a device as a heavy object for projecting pictures on a display surface is located in the rear direction Lb of the display surface including a screen, the body support may be inclined in the front direction Lf and move in the rear direction Lb while being raised to produce the same advantageous effects as the projector board stand 1 or 1a.

The embodiments of the present invention are directed to the structure including the body support 20 or 20a in the projector board stand 1 or 1a that is inclined in the opposite direction from a heavy object in the depth direction L to avoid becoming less stable when the body support with the heavy object is raised, rather than simply being inclined in the rear direction Lb.

REFERENCE SIGNS LIST 1,1a projector board stand
10 display body
11 projector
15 pivot operation unit
20, 20a body support
20X, 20Xa lift unit 22, 22a direction limiting support
23, 23a movable body support
24 lift operation unit
30 pivot unit
121 display surface
F floor surface
Hu upward direction
Hd downward direction
Lb rear direction
Lf front direction
ST upright posture
SL lying posture

The invention claimed is:

1. A picture display apparatus, comprising:
a projection device configured to project a picture;
a display body including a display surface to display the picture projected by the projection device; and
a body support supporting the display body,
wherein: the projection device is supported on the display body and protrudes in a facing direction of the display surface to project the picture on the display surface;
the body support includes a movable body support supporting the display body in a movable manner, and a direction limiting support configured to limit and support the movable body support to be raised upward in the opposite direction from the display surface;
the body support includes a lift unit configured to raise and lower the display body and;
the lift unit is configured to move the display body in an opposite direction from the display surface when the display body is raised; and
the lift unit includes the movable body support and the direction limiting support.

2. The picture display apparatus according to claim 1, wherein
the projection device is located at an upward position and in substantially the middle of the display body in the facing direction of the display surface.

3. The picture display apparatus according to claim 2, further comprising:
a lift operation unit configured to raise and lower the display body.

4. The picture display apparatus according to claim 3, wherein
the lift operation unit includes a position retaining unit configured to retain the display body at an intended position within a raising and lowering range allowed by the lift unit.

5. The picture display apparatus according to claim 3, wherein
the display body includes a pivot unit configured to pivot the display body between an upright posture in which the display body is located upright relative to a floor surface on which the display body is installed and a lying posture in which the display surface faces upward.

6. The picture display apparatus according to claim 5, wherein
the lift operation unit is located below the display body in the lying posture and around the pivot unit.

7. The picture display apparatus according to claim 5, further comprising:
a pivot operation unit configured to operate the pivot unit to pivot the display body; and
a state retaining unit configured to retain the display body at an intended angle between the upright posture and the lying posture.

8. The picture display apparatus according to claim 6, further comprising:
a pivot operation unit configured to operate the pivot unit to pivot the display body; and
a state retaining unit configured to retain the display body at an intended angle between the upright posture and the lying posture.

9. The picture display apparatus according to claim 7, wherein
the pivot operation unit is located at an upward position of the display body in the upright posture.

10. The picture display apparatus according to claim 8, wherein
the pivot operation unit is located at an upward position of the display body in the upright posture.

* * * * *